United States Patent

Araki et al.

[11] Patent Number: 5,463,554
[45] Date of Patent: Oct. 31, 1995

[54] VEHICLE NAVIGATION SYSTEM WHICH AUTOMATICALLY ADJUSTS TO A CHANGED TRAVEL ROUTE

[75] Inventors: Morio Araki; Katsuyoshi Hayashi; Yukiko Habu, all of Kawagoe, Japan

[73] Assignee: Pioneer Electronic Corporation, Tokyo, Japan

[21] Appl. No.: 260,834

[22] Filed: Jun. 16, 1994

[30] Foreign Application Priority Data

Jun. 18, 1993 [JP] Japan ................. 5-148100

[51] Int. Cl.$^6$ ................. G06F 17/00
[52] U.S. Cl. ................. 364/444; 364/443; 364/449; 340/995
[58] Field of Search ................. 364/443, 444, 364/445, 446, 447, 448, 449; 73/178 R; 340/990, 995, 988

[56] References Cited

U.S. PATENT DOCUMENTS

| | | | |
|---|---|---|---|
| 5,206,811 | 4/1993 | Itoh et al. ................. | 364/449 |
| 5,220,507 | 6/1993 | Kirson ................. | 364/444 |
| 5,243,528 | 9/1993 | Lefebvre ................. | 364/444 |
| 5,270,936 | 12/1993 | Fukushima et al. ................. | 364/444 |
| 5,274,387 | 12/1993 | Kakihara et al. ................. | 342/451 |
| 5,283,575 | 2/1994 | Kao et al. ................. | 340/990 |
| 5,293,163 | 3/1994 | Kakihara et al. ................. | 340/995 |
| 5,307,278 | 4/1994 | Hermars et al. ................. | 364/450 |
| 5,311,173 | 5/1994 | Komura et al. ................. | 340/995 |
| 5,345,388 | 9/1994 | Kashiwazaki ................. | 364/449 |

*Primary Examiner*—Kevin J. Teska
*Assistant Examiner*—Susan Wieland
*Attorney, Agent, or Firm*—Young & Thompson

[57] ABSTRACT

A navigation system installed in vehicle includes: a measurement unit for measuring current position of the vehicle and outputting current position data; a map data storage unit for storing map data; a display unit for displaying information; display control unit for representing, on the display unit, a map on the basis of the map data and position of the vehicle on the basis of the current position data; a transit point storage unit for storing transit point data corresponding to transit points on a way from start point to destination point; a guide unit for representing guide information on the basis of the transit point data; a distance calculation unit for calculating transit point distances from the current position to each of the transit points on the basis of the current position data and the transit point data; a comparison unit for comparing the transit point distances with a reference distance and for detecting a special transit point whose transit point distance is smaller than the reference distance; and a target point determination unit for setting a transit point which is to be passed subsequent to the special transit point as the next target point.

6 Claims, 7 Drawing Sheets

FIG. 4

| CORNER-TURN DATA | CONTENTS OF VOCAL GUIDE MESSAGE |
|---|---|
| 0 | NO GUIDE |
| 1 | TERGET TRANSIT POINT IS ADVANCED |
| 2 | SOON ARRIVE AT DESTINATION |
| 3 | DESTINATION COMES NEXT |
| 4 | SOON TURN RIGHT |
| 5 | TURN RIGHT NEXT |
| 6 | SOON TURN LEFT |
| 7 | TURN LEFT NEXT |
| 8 | SOON ARRIVE AT TERGET TRANSIT POINT |
| 9 | TERGET TRANSIT POINT COMES NEXT |

VEHICLE NAVIGATION SYSTEM WHICH AUTOMATICALLY ADJUSTS TO A CHANGED TRAVEL ROUTE

BACKGROUND OF THE INVENTION

Field of the Invention

This invention relates to a navigation system for vehicles, and more particularly to a navigation system capable of providing a route to destination display and a vocal guide message for driving.

Description of the Related Art

There is a stand-alone type navigation system known as a position measuring device used in vehicles such as automobiles, airplanes or ships. Stand-alone type navigation systems detect the two-dimensional displacement (vector) from azimuth data obtained by an azimuth sensor and velocity data obtained by a velocity sensor, and add the two-dimensional displacement to data of reference points to calculate current position of vehicle. In a case of automobiles, a predetermined number of pulses are generated for every rotation of the drive shaft of the automobile, and the travel distance between the reference point and current position is calculated on the basis of the total number of pulses thus generated. Then, the exact travel distance is obtained by multiplying the travel distance by a distance correction coefficient.

As a position measuring device utilizing space satellites, GPS (Global Positioning System) navigation system has been developed. The GPS navigation system generally receives electric waves from more than three GPS satellites, and calculates pseudo distance data including offset time between each of GPS satellites and electric wave receiving point and current position data of electric wave receiving point on the basis of the position data of the GPS satellites. Then, the GPS navigation system reads out map data around the calculated current position, using information processor unit, from a storage unit, stores the read out data, produces display data from stored map data and the current position data, and displays it. From the displayed information, the driver using the system can recognize the current position of the vehicle with relation to the map information.

Among navigation systems of this kind, a system has been developed which represents visual guide marks instructing turning corner left or right at certain transit points such as crossings on the way from a start point to a destination point. The navigation system calculates transit points from route data preset by user or calculated automatically by the system on the basis of data of start point and destination point defined by user. As described, an essential object of navigation system is to give driving information, such as current position or travel direction, to the user to assist his driving. Namely, it is used and operated as the user is driving, and therefore the system must not obstruct or hinder user's driving action. In this regard, there has been proposed a system which provides vocal guide messages, in place of visual guide marks, for turning corners.

However, in use of the above system, if part of travel route scheduled is altered and a certain transit point is not passed, the system cannot renew transit points subsequent to the eliminated (scheduled but not passed) transit point automatically. Further, in a case where a plurality of transit points are preset closely with each other relative to measurement accuracy of current position, the system may erroneously detect other transit point which should be passed later and therefore issue an erroneous vocal guide message to turn a corner in the wrong direction. Still further, the system does not consider the actual speed of vehicle and the time required for reaching the target transit point, and therefore the timing of vocal guide message is occasionally too early or too late.

SUMMARY OF THE INVENTION

It is an object of the present invention to provide a navigation system capable of providing an appropriate route guide, in various circumstances, based on preset route data.

According to one aspect of the present invention, there is provided a navigation system adapted to be installed in vehicles including: a measurement unit for measuring current position of the vehicle and outputting current position data; a map data storage unit for storing map data; a display unit for displaying information; a display control unit for representing, on the display unit, a map on the basis of the map data and the position of the vehicle on the basis of the current position data; a transit point storage unit for storing transit point data corresponding to transit points on a way from start point to destination point; a guide unit for representing guide information on the basis of the transit point data; a distance calculation unit for calculating transit point distances indicating distances from the current position to each of the transit points on the basis of the current position data and the transit point data; a comparison unit for comparing the transit point distances with a reference distance and detecting a special transit point whose transit point distance is smaller than the reference distance; and a target point determination unit for setting a transit point which is to be passed subsequent to the special transit point as next target point.

According to the navigation system thus constructed, the system is advantageously provided with the transit point storage unit, the distance calculation unit, the comparison unit and the target point determination unit. If the system detects a transit point which should be passed after the target transit point prior to the target transit point, the transit point subsequent to the detected transit point is set to the new target transit point. Therefore, if the travel route is changed and the target transit point is not passed, the system automatically sets the new target transit point.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 4 is a diagram illustrating contents of vocal guide messages;

DESCRIPTION OF THE PREFERRED EMBODIMENTS

Preferred embodiments of the present invention will be described below with reference to the accompanying drawings.

Figure 1:
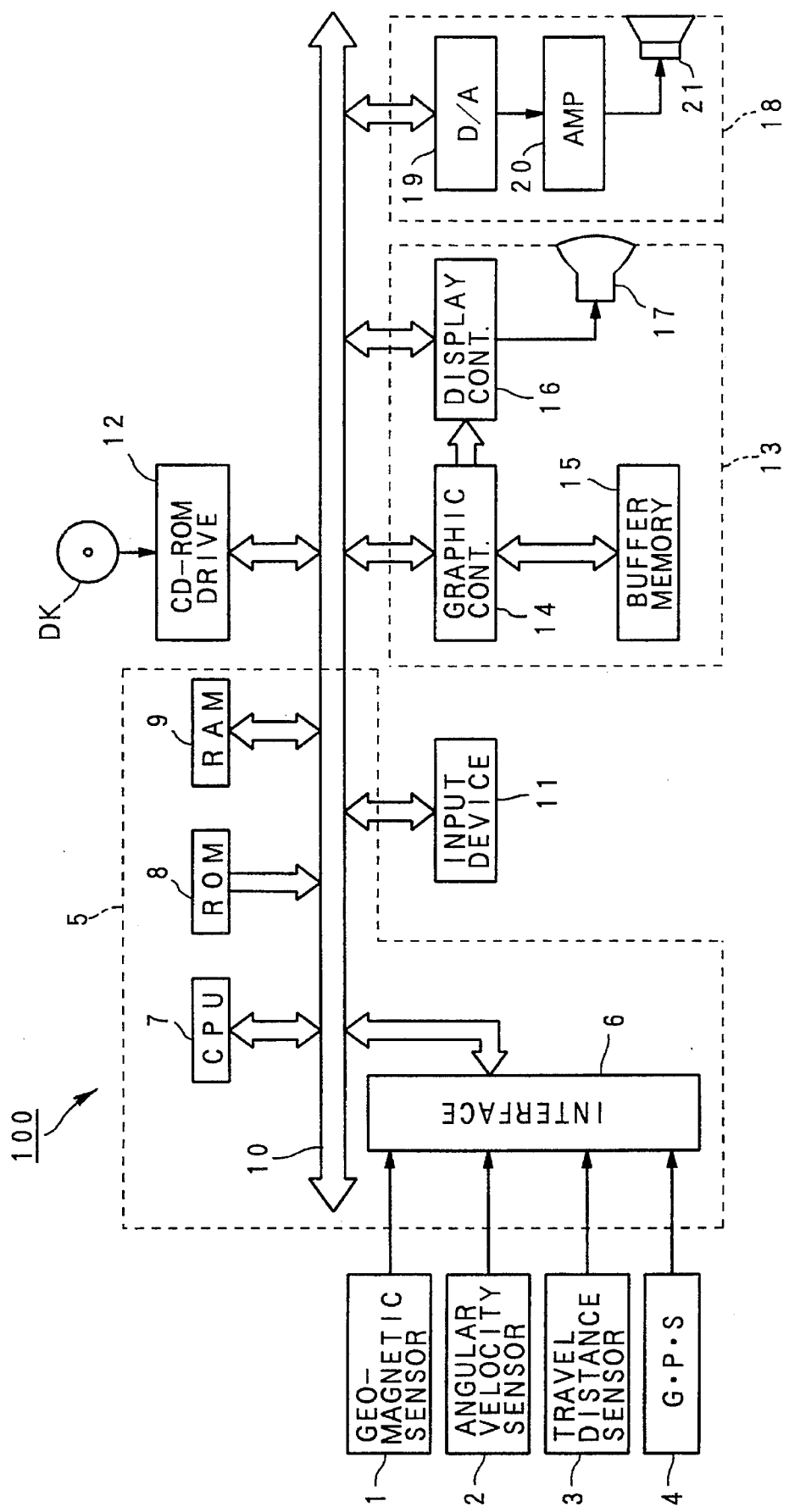
FIG. 1 is a block diagram illustrating construction of navigation system according to an embodiment of the present invention.

FIG. 1 is a block diagram illustrating the construction of a navigation system according to an embodiment of the present invention. Navigation system 100 includes geomagnetic sensor 1, angular velocity sensor 2, travel distance sensor 3, GPS receiver 4, system controller 5, input device 11, CD-ROM (Compact Disk Read Only Memory) drive 12, display unit 13, and sound reproduction unit 18. The geomagnetic sensor 1 outputs azimuth data indicating the travel direction of vehicle. The angular velocity sensor 2 detects the angular velocity of vehicle, and outputs angular velocity data. The travel distance sensor 3 detects and integrates the rate of rotation of the vehicle shaft and outputs travel distance data. The GPS receiver 4 receives electric waves from GPS satellites and outputs GPS position-measurement data. The system controller 5 controls the whole system on the basis of the azimuth data, angular velocity data, travel distance data and the GPS position-measurement data. The input device 11 receives various instructions from the user. The CD-ROM drive 12 reads out various data from CD-ROM DK under control of the system controller 5, and outputs it. The display unit 13 displays various display data under control of the system controller 5. The sound reproduction unit 18 reproduces and outputs various vocal data under control of the system controller 5.

The system controller 5 includes interface 6, CPU 7, ROM (Read Only Memory) 8, and RAM (Random Access Memory) 9. The interface 6 performs interface function with external devices, and the CPU 7 controls the system controller 5. The ROM 8 stores control program for controlling the system controller 5, and the non-volatile unit 9 stores various data random-accessibly. The input device 11, the CD-ROM drive 12, the display unit 13 and the sound reproduction unit 18 are connected by bus-line 10. The display unit 13 includes a graphic controller 14, buffer memory 15, display 17 and a display controller 16. The graphic controller 14 controls the display unit 13 based on control data transferred from the CPU 7 via the bus-line 10. The buffer memory 15 is comprised of memory such as VRAM (Video RAM) which temporarily stores video information to be displayed. The display 17 includes a liquid-crystal or CRT (Cathode Ray Tube) display, and the display controller 16 controls the display 17 based on video data output from the graphic controller 14. The sound reproduction unit 18 includes a D/A converter 19, amplifier 20 and speaker 21. The D/A converter 19 performs digital-to-analog conversion on digital audio data transferred, via bus-line 10, from the CD-ROM drive 12 or RAM 9. The amplifier 20 amplifies analog audio signal output from the D/A converter 19, and the speaker 21 converts the amplified audio signal into an acoustic wave and outputs it.

Figure 2:
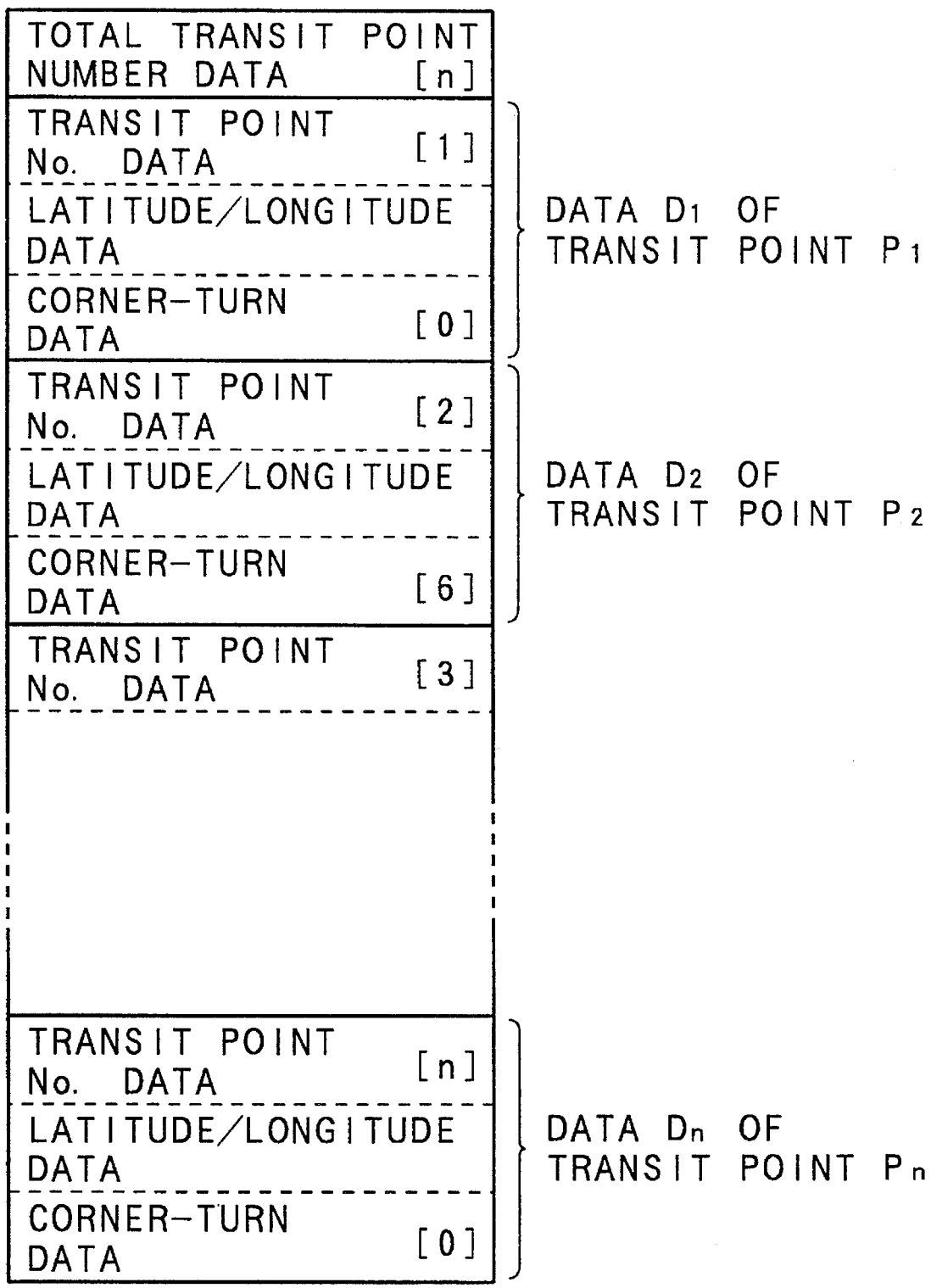
FIG. 2 is a diagram illustrating the data stored in RAM.
Figure 3:
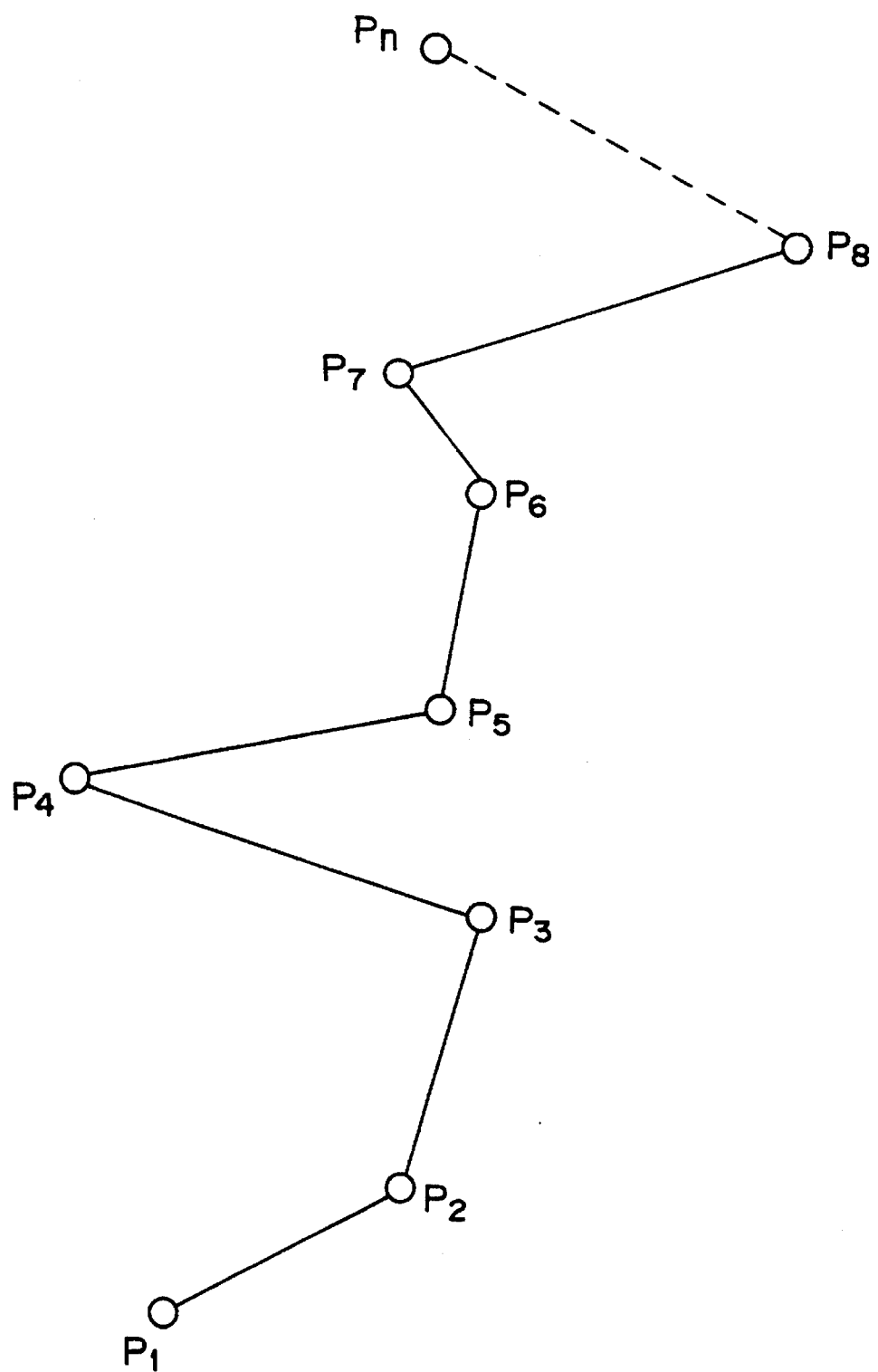
FIG. 3 is a diagram illustrating an example of arrangement of transit points.

Next, the composition of transit point data and vocal guide message data stored in the RAM 9 are described with reference to FIGS. 2 to 4. As shown in FIG. 2, transit point data includes total transit point number data, position data (transit point No. data and latitude/longitude data) and corner-turn data of points $P_2$–$P_{n-1}$ shown in FIG. 3 (hereinafter referred to as "transit point") on the way from start point $P_1$ to destination point $P_n$. Namely, if travel route is scheduled to start from the start point $P_1$, pass the transit points $P_2$–$P_{n-1}$, and to end at the destination point $P_n$, transit point data includes at least transit point No. data for specifying transit points, latitude/longitude data of the transit point and corner-turn data instructing left-turn or right-turn at transit point. Vocal guide message data includes the data shown in FIG. 4, for example. Corner-turn data in transit point data shown in FIG. 2 indicates vocal guide messages as shown in FIG. 4, and corner-turn data No. 1 corresponds to vocal guide message of "Target transit point is advanced", for example.

Next, the manner in which the navigation system guides the user utilizing these data will be described. The system controller 5 calculates current the position of the vehicle on the basis of data (azimuth data, angular velocity data, travel distance data and GPS position-measurement data) supplied from the geomagnetic sensor 1, the angular velocity sensor 2, the travel distance sensor 3 and the GPS receiver 4, respectively. Then, the system controller 5 discriminates, referring to the transit point data stored in the RAM 9, whether or not any of the transit points specified by the latitude/longitude data exists within the detection range from the current position of the vehicle. As a result of the discrimination, if transit point exists within the detection range from the current position, the system controller 5 outputs vocal guide message referring to corner-turn data corresponding to the transit point. For example, when the vehicle arrives at the transit point $P_2$, vocal guide message "Soon turn left" which corresponds to corner-turn data No. 6 is output. Then, target transit point is altered to the next one, i.e, transit point $P_3$.

Figure 5:
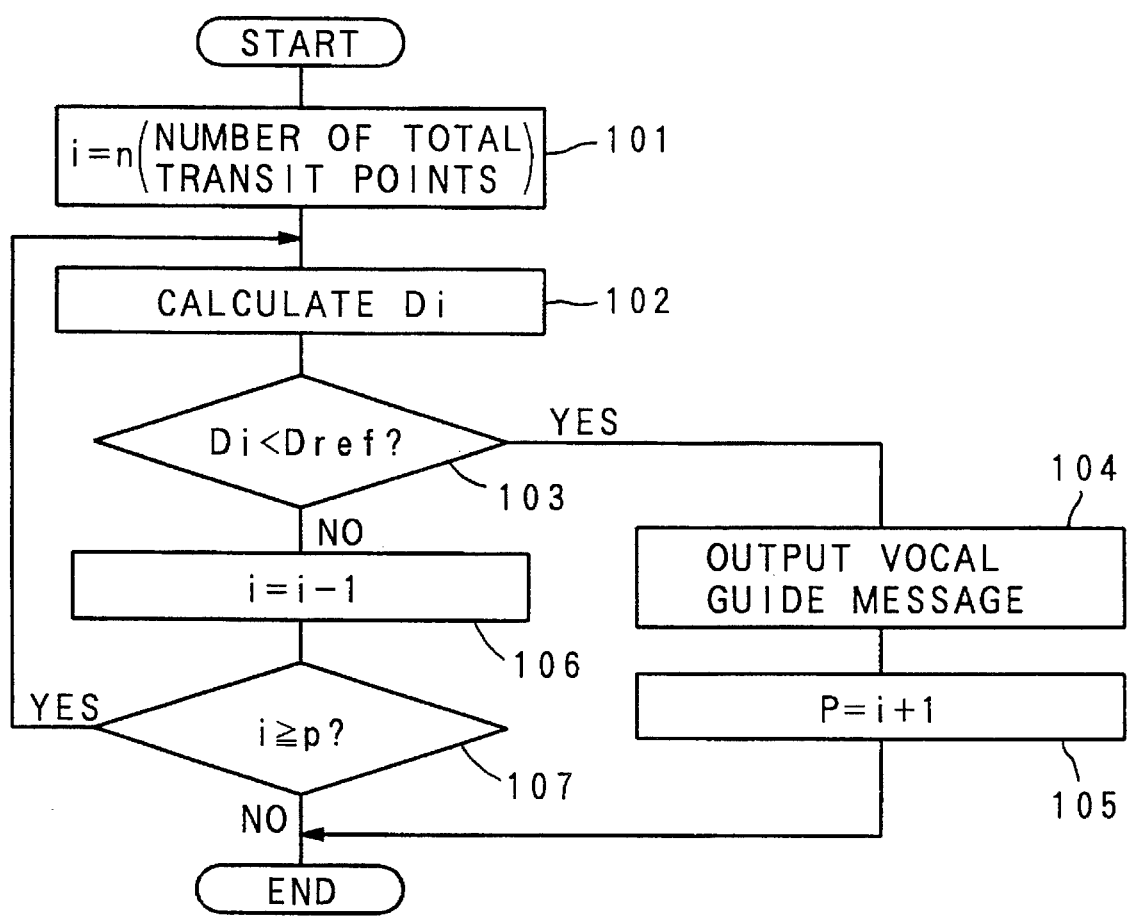
FIG. 5 is a flowchart illustrating the manner of determining next target transit points according to the first embodiment of the present invention.

Next, the manner of determining target transit point will be described with reference to the flowchart of FIG. 5. It is noted that the target transit point is one of the transit points to which vehicle is driven. The target transit point is initially set to transit point $P_1$, and therefore the parameter p indicating target transit point is initially set to "1". When user inputs total number n of transit points via the input device 11, the value n is set to parameter i (step 101). In actuality, processing described below is initially performed for destination point $P_n$ (i.e., i=n) in this manner. However, the following description will be directed to operation for i-th transit point, for the sake of generality. Next, the system controller 5 calculates the transit point distance $D_i$ (distance from the current point to i-th transit point) using the transit point data (step 102), and discriminates whether the following relationship is satisfied or not (step 103):

$$D_i < D_{ref}$$

Here, $D_{ref}$ indicates distance defining detection range. Namely, within the detection range from the current position, the target transit point is searched for. If the above relationship is not satisfied, that is, the i-th transit point is out of the detection range (step 103, NO), the system controller 5 decrements the value of the parameter i by one (i.e., i=i−1, step 106), and discriminates whether the next transit point $P_{i-1}$ with which new transit point distance $D_i$ is to be calculated is the target transit point $P_p$ or not (i.e., i≧ p, step 107). If i≧p, the steps 102–106 are repeated until the discrimination results in NO, that is, until the transit point $P_i$ coincides with the target transit point $P_p$ (i.e., i=p).

On the other hand, if the discrimination in step 103 results in YES, it means that i-th transit point $P_i$ which should be passed after the current target transit point $P_p$, according to preset travel route, is detected within the detection range prior to the detection of the target transit point $P_p$. By steps 106 and 107, it is discriminated that: $i-1 \geq p$, and therefore, $i > p$. This means that the i-th transit point $P_i$ is preset to be passed after the current target transit point $P_p$. In addition, step 103 discriminates whether the i-th transit point $P_i$ is within the detection range or not. Therefore, if steps 107 and 103 result in YES, it means that i-th transit point $P_i$ which should be passed after the current target transit point $P_p$, according to preset travel route, is detected in the detection range prior to the target transit point $P_p$. In this case, the system controller 5 reads out information of vocal guide message ("Target transit point is advanced") from the CD-ROM DK. The read-out data is subjected to D/A conversion by the D/A converter 19, and is output as vocal guide message after amplified by the amplifier 20 (step 104). Then, transit point $P_{i+1}$ is set to the next target transit point (i.e., $p=i+1$, step 105). In this way, if target transit point $P_p$ is not passed due to alteration of travel route, the system ignores the transit point $P_p$ and determines target transit point ($P_{i+1}$) subsequent to the detected transit point ($P_i$) as new target transit point.

As described above, according to the first embodiment, if the system detects a transit point which should be passed after the target transit point, according to preset travel route, prior to the target transit point, the transit point subsequent to the detected transit point is set to the new target point. Therefore, if the travel route is changed and the target transit point is not passed, the system automatically sets the new target transit point.

Figure 6:
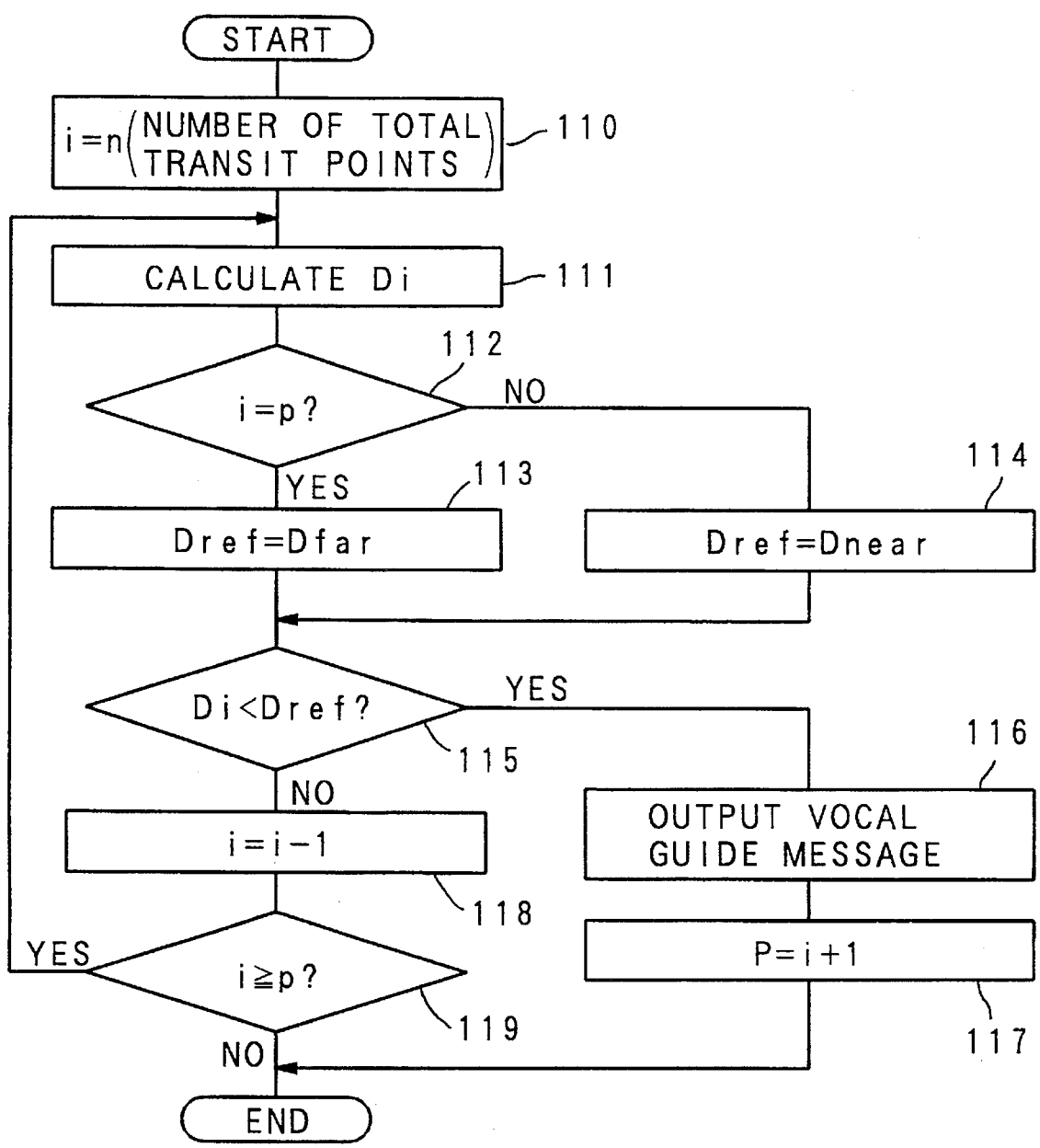
FIG. 6 is a flowchart illustrating the manner of determining the next target transit points according to the second embodiment of the present invention.

A navigation system according to a second embodiment of the present invention is same as the system of the first embodiment in construction and format of the transit point data. The manner of determining the next target transit point will be described with reference to the flowchart of FIG. 6. When the user inputs the total number n of transit points via the input device 11, the number n is set to parameter i (step 110). In actuality, processing described below is initially performed for destination point $P_n$ in this manner. However, the following description will be directed to operation for i-th transit point, for the sake of generality. Next, the system controller 5 calculates transit point distance $D_i$ (distance from the current point to i-th transit point) using the transit point data (step 111), and discriminates whether the following relationship is satisfied or not (step 112):

$$i=p.$$

This step discriminates whether the i-th transit point $P_i$ is the target transit point or not. If the relationship is satisfied (step 112, YES), the system sets the value of $D_{ref}$ (step 113) so that the following equation stands:

$$D_{ref}=D_{far}.$$

Alternately, if the relationship is not satisfied (step 112, NO), the system sets the value $D_{ref}$ (step 114) so that the following equation stands:

$$D_{ref}=D_{near}.$$

Here, $D_{ref}$ indicates distance defining detection range. Namely, within the detection range, target transit point is searched for. $D_{near}$ is first reference distance, and $D_{far}$ is second reference distance longer than the first reference distance $D_{near}$. This is to define the detection range of target transit point broader than that of the other transit points. Namely, with respect to the target transit point, the detection range is defined broader. Next, the system controller 5 discriminates whether the following relationship is satisfied or not (step 115):

$$D_i < D_{ref}.$$

Namely, within the detection range, the target transit point is searched for. If the above relationship is not satisfied, that is, if the i-th transit point is out of the detection range (step 115, NO), the system controller 5 decrements the value of the parameter i by one (i.e., $i=i-1$, step 118), and discriminates whether the next transit point $P_{i-1}$ with which new transit point distance $D_i$ is to be calculated is the target transit point $P_p$ or not (i.e., $i \geq p$, step 119). If $i \geq p$, the steps 111–115 and 118 are repeated until the discrimination results in NO, that is, the transit point $P_i$ coincides with the target transit point $P_p$.

On the other hand, if the discrimination in step 115 results in YES, it means that i-th transit point $P_i$ which should be passed after the current target transit point $P_p$, according to preset travel route, is detected in the detection range prior to the target transit point $P_p$. In this case, the system controller 5 reads out information of vocal guide message ("Target transit point is advanced") from the CD-ROM DK. The read-out data is subjected to D/A conversion by the D/A converter 19, and is output as vocal guide message after being amplified by the amplifier 20 (step 116). Then, transit point $P_{i+1}$ is set to next target transit point (i.e., $p=i+1$, step 117). In this way, if the travel route is changed and the target transit point is not passed, the system automatically sets the new target transit point.

As described above, according to the second embodiment, the detection range with respect to the target transit point is set to be broader than that of the other transit points. Therefore, the system can detect the target transit point from a relatively farther position than other transit points, and the possibility of erroneous guide is reduced even in the case where a plurality of transit points are set relatively closely with each other.

Figure 7:
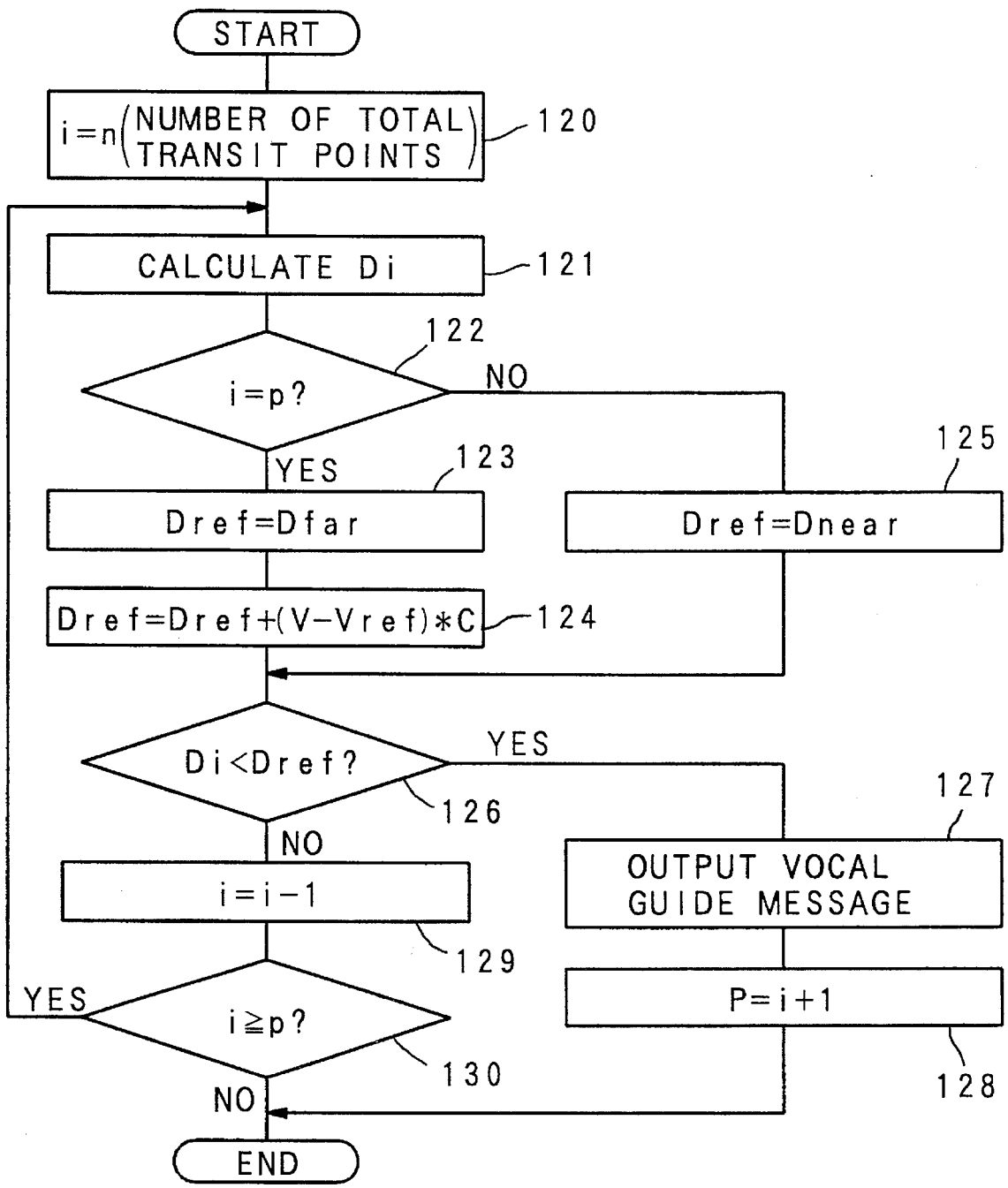
FIG. 7 is a flowchart illustrating the manner of determining the next target transit points according to the third embodiment of the present invention.

A navigation system according to a third embodiment of the present invention is same as the system of the first and second embodiments in construction and format of the transit point data. The manner of determining the target transit point will be described with reference to the flowchart of FIG. 7. When user inputs total number n of transit points via the input device 11, the number n is set to parameter i (step 120). In actuality, processing described below is firstly performed for destination point $P_n$ in this manner. However, following description will be directed to operation for i-th transit point, for the sake of generality. Next, the system controller 5 calculates the transit point distance $D_i$ (distance from the current point to i-th transit point) using the transit point data (step 121), and discriminates whether the following relationship is satisfied or not (step 122):

$$i=p.$$

This step discriminates whether the i-th transit point $P_i$ is target transit point or not. If the relationship is satisfied (step 122, YES), the system sets the value of $D_{ref}$ (step 123) so that the following relationship stands:

$$D_{ref}=D_{far}.$$

Further, the system corrects the value $D_{ref}$ according to the following equation:

$$D_{ref}=D_{ref}+(V-V_{ref}) \times C.$$

Here, V indicates vehicle velocity, $V_{ref}$ indicates reference value of vehicle velocity, and C is a constant. This is to correct the value $D_{ref}$ directly proportional to the vehicle velocity. Namely, if the vehicle is driven at high speed, the detection range is set to be broader, and if the vehicle is driven at low speed, the detection range is set to be narrower.

Alternately, if the relationship is not satisfied (step 122, NO), the system sets the value $D_{ref}$ (step 125) so that the following equation stands:

$$D_{ref}=D_{near}.$$

Here, $D_{ref}$ indicates distance defining detection range. $D_{near}$ is first reference distance, and $D_{far}$ is second reference distance longer than the first reference distance $D_{near}$. This is to define the detection range of the target transit point broader than that of the other transit points. Next, the system controller 5 discriminates whether the following relationship is satisfied or not (step 126):

$$D_i<D_{ref}.$$

Namely, within the detection range, the target transit point is searched for. If the above relationship is not satisfied, that is, if the i-th transit point is out of the detection range (step 126, NO), the system controller 5 decrements the value of the parameter i by one (i.e., i=i−1, step 129), and discriminates whether the next transit point $P_{i-1}$ with which new transit point distance $D_i$ is to be calculated is the target transit point $P_p$ or not (i.e., i≧p, step 130). If i≧p, the steps 121–126 and 129 are repeated until the discrimination results in NO, that is, until the transit point $P_i$ coincides with the target transit point $P_p$ (i.e, i=p).

On the other hand, if the discrimination in step 126 results in YES, it means that i-th transit point $P_i$ which should be passed after the current target transit point $P_p$, according to preset travel route, is detected within the detection range prior to the target transit point $P_p$. In this case, the system controller 5 reads out information of vocal guide message ("Target transit point is advanced") from the CD-ROM DK. The read-out data is subjected to D/A conversion by the D/A converter 19, and is output as vocal guide message after being amplified by the amplifier 20 (step 127). Then, the transit point $P_{i+1}$ is set to next target transit point (i.e., p=i+1, step 128). In this way, if the travel route is changed and the target transit point is not passed, the system automatically sets new target transit point.

According to the above embodiment, $D_{ref}$ is corrected in step 124 by the following equation:

$$D_{ref}=D_{ref}+(V-V_{ref})\times C.$$

However, the relationship between the vehicle velocity V [km/h] and the reference detection range $D_{ref}$ may be defined in the following manner:

if $V\leq 40$, $D=350$, if $40<V\leq 50$, $D=450$, if $50<V\leq 60$, $D=550$, if $60<V\leq 70$, $D=650$, if $70<V\leq 80$, $D=750$, if $80<V\leq 90$, $D=850$, if $90<V\leq 100$, $D=950$, if $100<V\leq 110$, $D=1050$, if $110<V\leq 120$, $D=1150$, if $120<V\leq 130$, $D=1250$, if $130<V\leq 140$, $D=1350$, if $140<V\leq 150$, $D=1450$, if $150<V\leq 160$, $D=1550$, if $160<V\leq 170$, $D=1650$, if $170<V\leq 180$, $D=1750$, if $180<V\leq$, $D=1850$, As described above, according to the third embodiment, the detection range of the target transit point is determined in accordance with vehicle velocity so as to stabilize a variation in the time period from detection of the target transit point to actual arrival there, resulting from variation of velocity of vehicle. Therefore, vocal guide message is output at correct timing. In addition, in such a case that vehicle driving highway should pass an interchange and then reach to a destination point which is nearer than the interchange on map, the erroneous detection of the destination point prior to the interchange may be avoided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A navigation system installed in a vehicle comprising:

measurement means for measuring a current position of the vehicle and for outputting current position data;

road map data storage means for storing road map data;

display means for displaying information;

display control means for permitting said display means to display the current position of the vehicle on the basis of the current position data and a road map around the current position of the vehicle on the basis of the road map data;

transit point storage means for storing transit point data representing positions of a plurality of transit points located on a travel route from a start point to a destination and travel order data representing a travel order according to which the vehicle passes the transit points;

guide means for representing guide information relating to the travel route on the basis of the transit point data and the travel order data;

distance calculation means for continuously calculating a transit point distance from the current position, moving according to movement of the vehicle, to the transit point for each of the transit points on the basis of the current position data and the transit point data;

comparison means for comparing the transit point distances with a predetermined reference distance during driving of the vehicle and for detecting a special transit point which transit point distance is smaller than the reference distance; and target point determination means for determining a target transit point to be passed next according to the travel order on the basis of the travel order data, wherein said target point determination means changes the target transit point to the transit point to be passed subsequently to the special transit point according to the travel order, when said comparison means detects the special transit point during driving of the vehicle.

2. A navigation system according to claim 1, further comprising a reference distance alteration means for setting a first reference distance to the reference distance when the transit point with which the transit point distance is calculated is the target transit point, and setting a second reference distance to the reference distance when the transit point with which the transit point distance is calculated is not the target transit point, said first reference distance being longer than the second reference distance.

3. A navigation system according to claim 1, further comprising reference distance correction means for correcting the first reference distance in accordance with the velocity of the vehicle.

4. A navigation system according to claim 1, wherein said guide means comprises means for outputting a vocal guide message to inform a driver of the vehicle of the instructing turning direction at the transit points.

5. A navigation system according to claim 1, wherein said comparison means compares the transit point distances in order from the destination point to the target transit point.

6. A navigation system according to claim 1, wherein said transit point data further comprises corner-turn data comprising instructions relative to a turning direction of the vehicle at the transit points.

* * * * *